United States Patent
Qian

(10) Patent No.: US 8,243,380 B2
(45) Date of Patent: Aug. 14, 2012

(54) ELECTROMECHANICAL DEVICE FOR SWITCHING AN OPTICAL LENS FILTER FOR A CAMERA

(76) Inventor: Benning Qian, Ningbo (CN)

( * ) Notice: Subject to any disclaimer, the term of this patent is extended or adjusted under 35 U.S.C. 154(b) by 217 days.

(21) Appl. No.: 12/701,353

(22) Filed: Feb. 5, 2010

(65) Prior Publication Data

US 2011/0194197 A1    Aug. 11, 2011

(51) Int. Cl.
*G02B 5/22* (2006.01)
(52) U.S. Cl. ........................................................ 359/889
(58) Field of Classification Search .................. 359/889, 359/892; 348/360
See application file for complete search history.

(56) References Cited

U.S. PATENT DOCUMENTS

| | | |
|---|---|---|
| 3,672,268 A | 6/1972 | Scheibel et al. |
| 7,158,323 B2 | 1/2007 | Kim et al. |
| 7,567,286 B2 * | 7/2009 | Takei et al. ................... 348/335 |
| 2007/0291157 A1 | 12/2007 | Ding et al. |

* cited by examiner

*Primary Examiner* — Joseph P Martinez
(74) *Attorney, Agent, or Firm* — Head, Johnson & Kachigian, P.C.

(57) ABSTRACT

A device for selectively inserting an optical lens filter, such as day optical filter and a night optical filter, into an optical path of a camera in accordance with light intensity and/or a signal from a user or timer. The device for switching an optical lens filter may include an electromechanical solenoid that provides a mechanical force to move a cantilevered filter arm between a first position and a second position according to the polarity of the magnetic field generated by the electromechanical solenoid. The device for switching an optical lens filter may include an electrical switch for determining the position of the cantilevered filter arm during operation.

20 Claims, 8 Drawing Sheets

ELECTROMECHANICAL DEVICE FOR SWITCHING AN OPTICAL LENS FILTER FOR A CAMERA

BACKGROUND OF THE INVENTION

1. Field of the Invention

This invention relates generally to a device for switching an optical lens filter for a camera, and more particularly to an electromechanical device for selective switching between at least one optical lens filter, such as between a day and night optical lens filter, between a first position and a second position in order to selectively insert the optical lens filter into an optical path of a camera.

2. Description of the Related Art

Game cameras are typically associated with hunters and the pursuit of big game animals, such as elk and deer. Game cameras have evolved from 35 mm film cameras into 6.0 megapixel digital infrared cameras. The primary purpose of a game camera is too capture an image of a deer or other game without invading their habitat and spooking the animal, giving hunters the ability to tell where game is located for preseason scouting. The information tells hunters where to best place their blind or tree-stand.

It is therefore desirable to provide a device for selective and/or automated switching an optical lens filter for a camera.

It is further desirable to provide a device for selective switching between at least one optical lens filter, such as between a day and night optical lens filter, between a first position and a second position in order to selectively insert the optical lens filter into an optical path of a camera.

SUMMARY OF THE INVENTION

In general, the invention relates to a device for switching an optical lens filter for a camera having a cantilevered filter arm pivotally secured to a housing and having at least one optical lens filter capable of being selectively inserted into an optical path of a camera. The device for switching an optical lens filter for a camera also has an electromechanical solenoid secured within the housing. The electromechanical solenoid has an armature engaged with the cantilevered filter arm, and the electromechanical solenoid provides a mechanical force to move the cantilevered filter arm between a first position and a second position according to a polarity of a magnetic field generated by the electromechanical solenoid.

The cantilevered filter arm may be pivotally secured to the housing at a first end thereof and may have the optical lens filter removably secured to a second end. In addition, the cantilevered filter arm can include an elongated, protruding shaft intermediate of the first end and the second end. The first end of the cantilevered arm may include a generally cylindrical female coupling pivotally engaged about an elongated cylindrical male coupling protruding from the housing. The male coupling acts as the point of rotation for the cantilevered filter arm when moving between the first position and the second position.

The electromechanical solenoid may include an electromagnetically conductive coil wound around a bobbin. The bobbin has an axial channel in a substantially parallel alignment with a channel of the housing through which an elongated shaft of the cantilevered arm protrudes through. The armature is slidably disposed within the axial channel of the bobbin. In addition, the housing may also include opposing ends with a magnetic material, such as a ferromagnetic metal or a ferromagnetic compound.

The device for switching an optical lens filter for a camera may further include an electrical switch, such as a micro switch or a snap action switch, for determining a position of the cantilevered filter arm. The electrical switch is within a switch housing, which may be secured to the housing. The electrical switch can include an arm, an actuator button, a stiff metal strip and electrical contacts.

Other advantages and features will be apparent from the following description, and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the construction and the arrangement of the structural and function details disclosed herein without departing from the spirit and scope of this disclosure. It is understood that the devices and methods are not limited to the embodiments set forth herein for purposes of exemplification.

Figure 1:
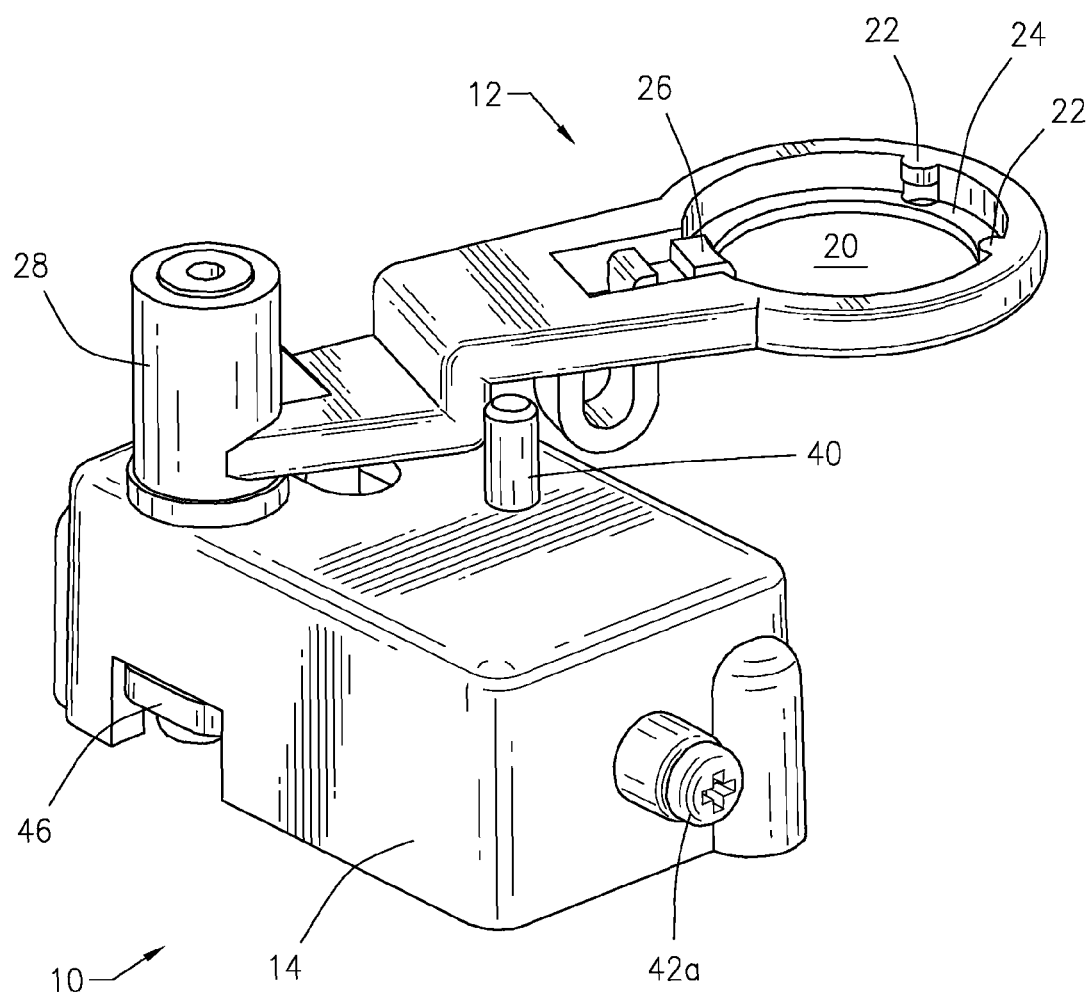
FIG. 1 is a perspective view of an example of a device for switching an optical lens filter for a camera in accordance with an illustrative embodiment of the device for switching an optical lens filter for a camera disclosed herein.

Referring to the figures of the drawings, wherein like numerals of reference designate like elements throughout the several views, and initially to FIG. 1, a device for switching an optical lens filter for a camera 10 having a cantilevered filter arm 12 pivotally secured to a housing 14 and an electromechanical solenoid 16 secured within the housing 14. The electromechanical solenoid 16 provides a mechanical force to move the cantilevered filter arm 12 between a first position (FIGS. 4 and 5) and a second position (FIGS. 6 and 7) according to the polarity of the magnetic field generated by the electromechanical solenoid 16. The cantilevered filter arm 12 includes an optical lens filter 18 removably disposed therein. The optical lens filter 18 may be any type of known filter that is inserted into an optical path of a camera (not shown), such as day optical filter and a night optical filter that are selectively inserted into the optical path in accordance with light intensity and/or a signal from a user or timer. The cantilevered filter arm 12 may include a pocket 20 into which the optical lens filter 18 is removably secured; for example, an outer periphery of the optical lens filter 18 can be sandwiched between a pair of tabs 22 and an annular shoulder 24 and retained by a retractable clip 26.

Figure 2:
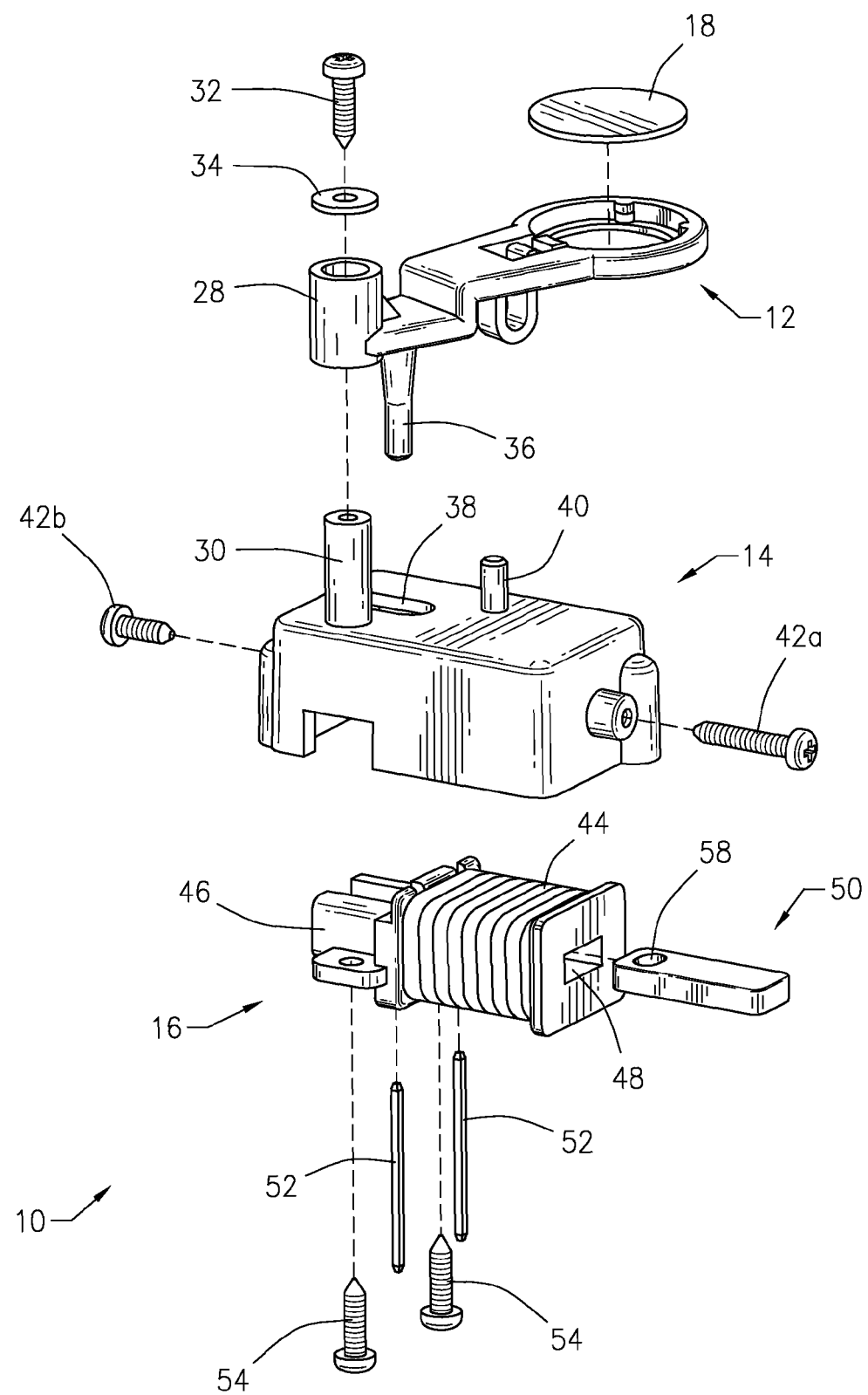
FIG. 2 is an exploded view of the device for switching an optical lens filter for a camera as shown in FIG. 1.
Figure 3:
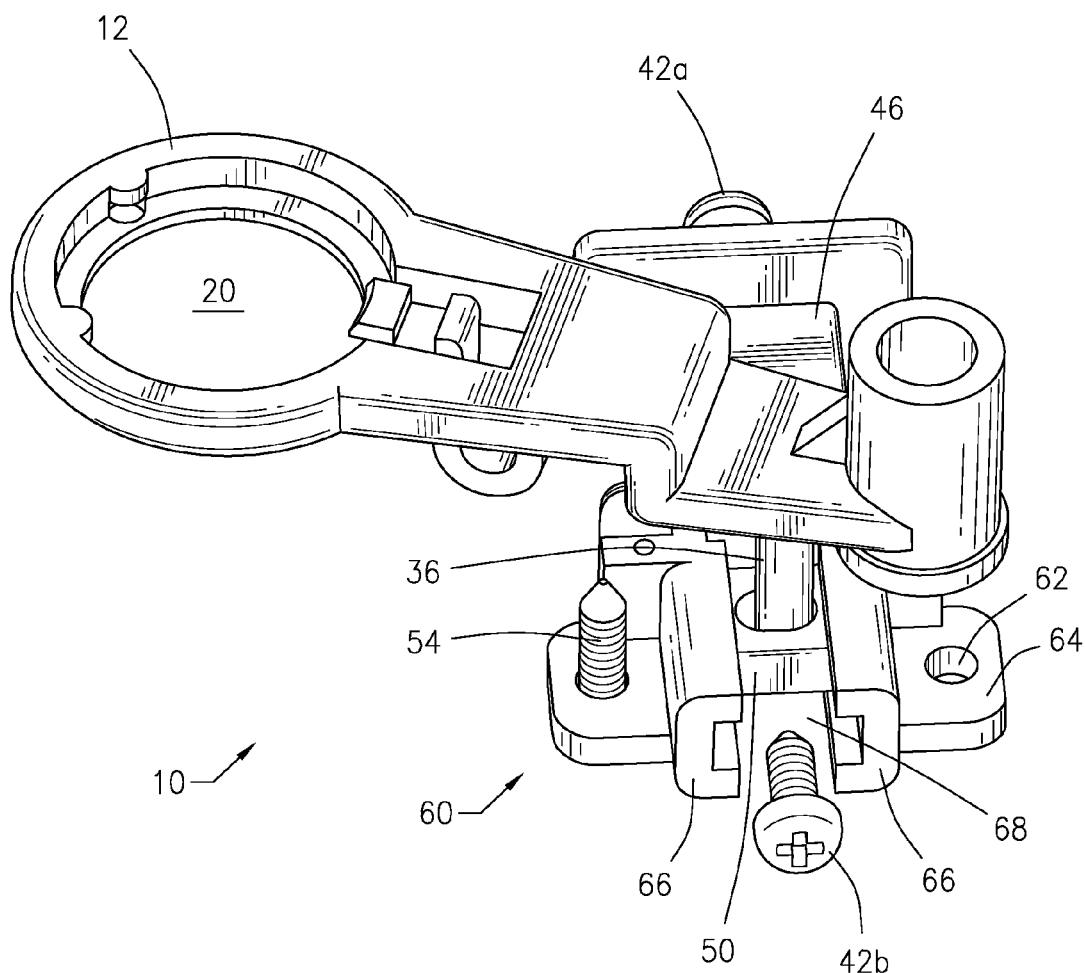
FIG. 3 is a top perspective view of the device for switching an optical lens filter for a camera shown in FIG. 1 with the housing removed.
Figure 4:
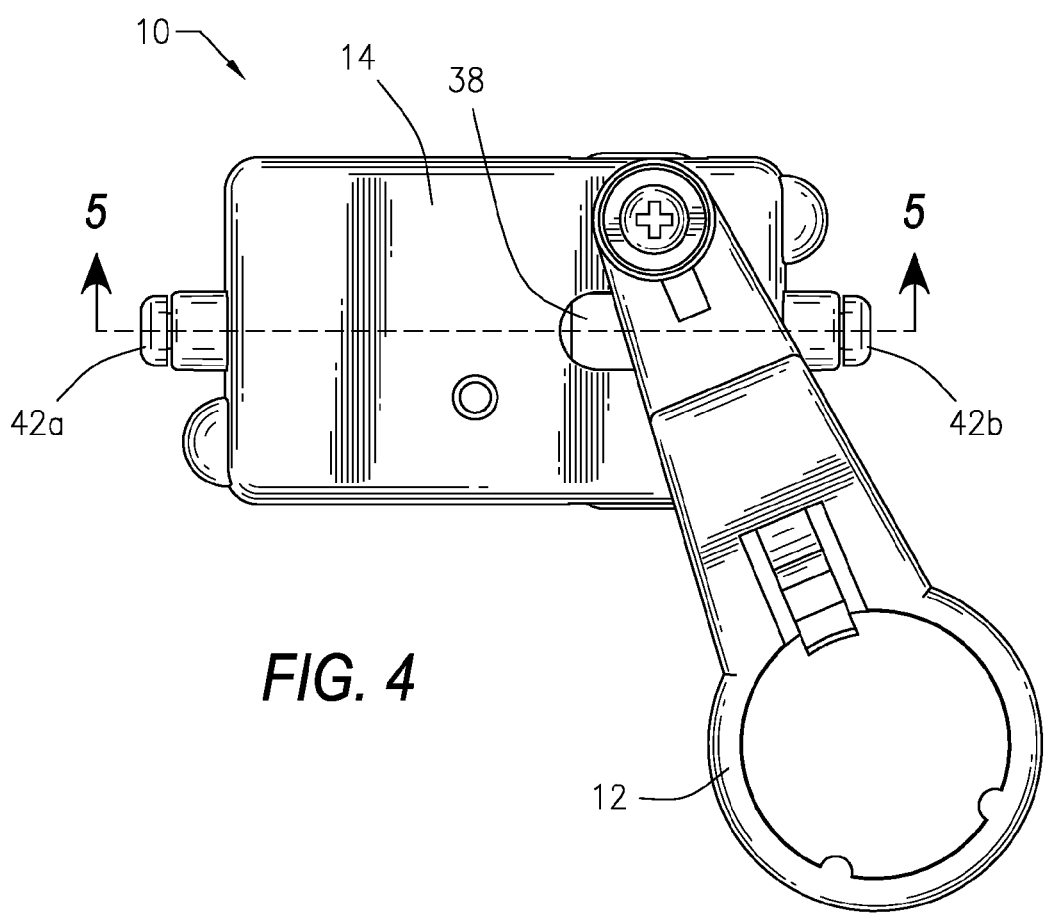
FIG. 4 is a top view of the device for switching an optical lens filter for a camera of FIG. 1 with a lens filter in a first position.
Figure 5:
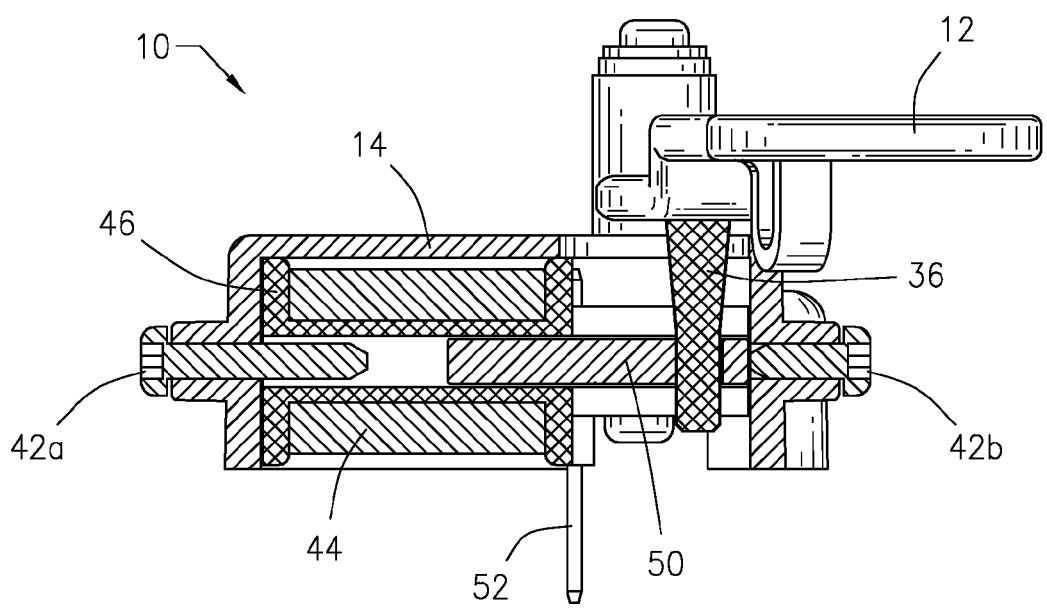
FIG. 5 is a cross-sectional view along line 5-5 of the device for switching an optical lens filter for a camera shown in FIG. 4.
Figure 6:
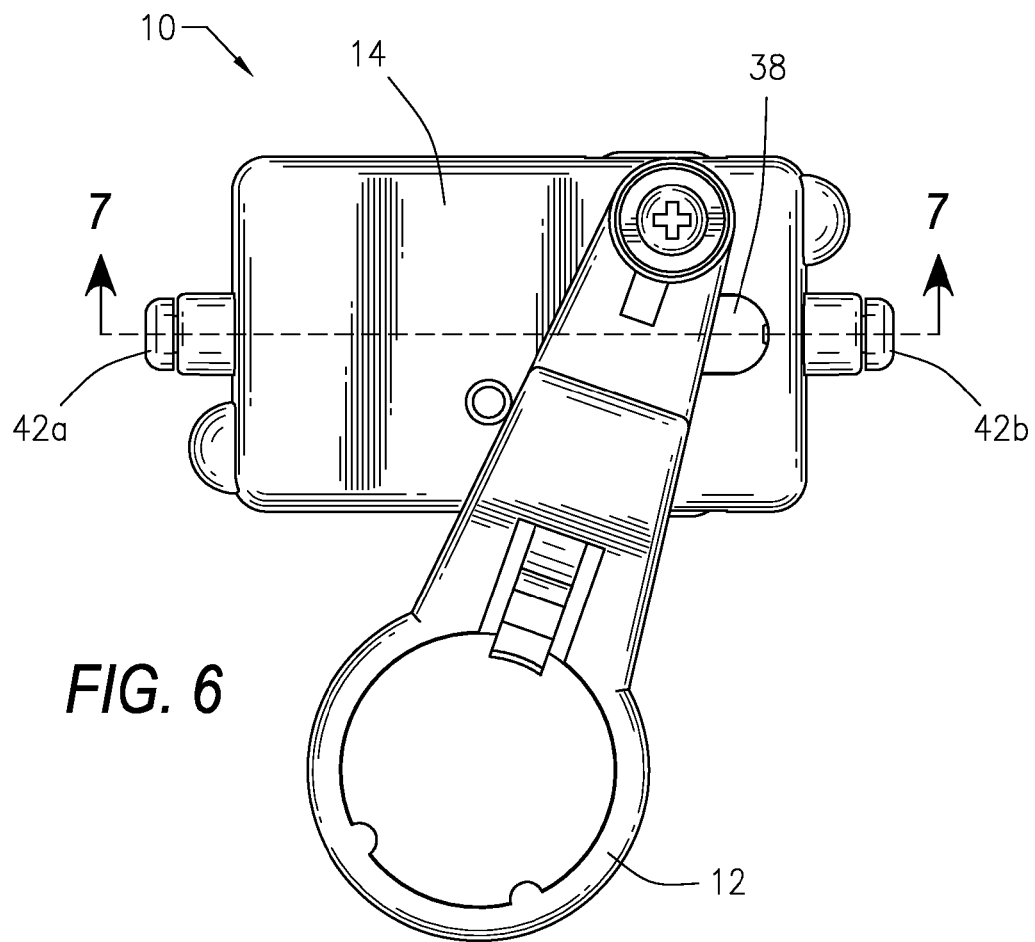
FIG. 6 is a top view of the device for switching an optical lens filter for a camera of FIG. 1 with the lens filter in a second position.
Figure 7:
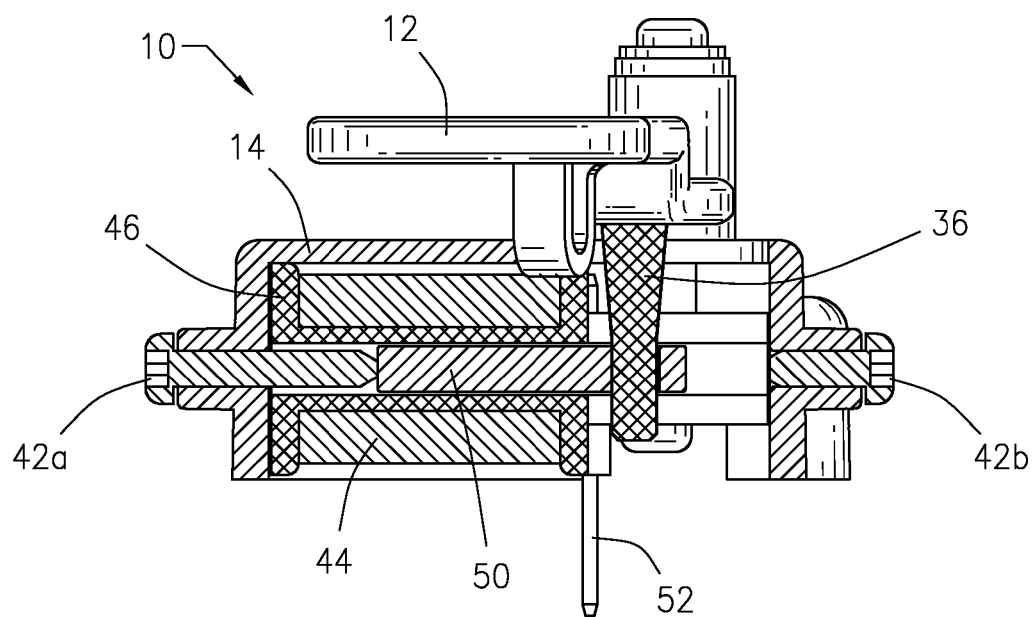
FIG. 7 is a cross-sectional view along line 7-7 of the device for switching an optical lens filter for a camera shown in FIG. 6.
Figure 8:
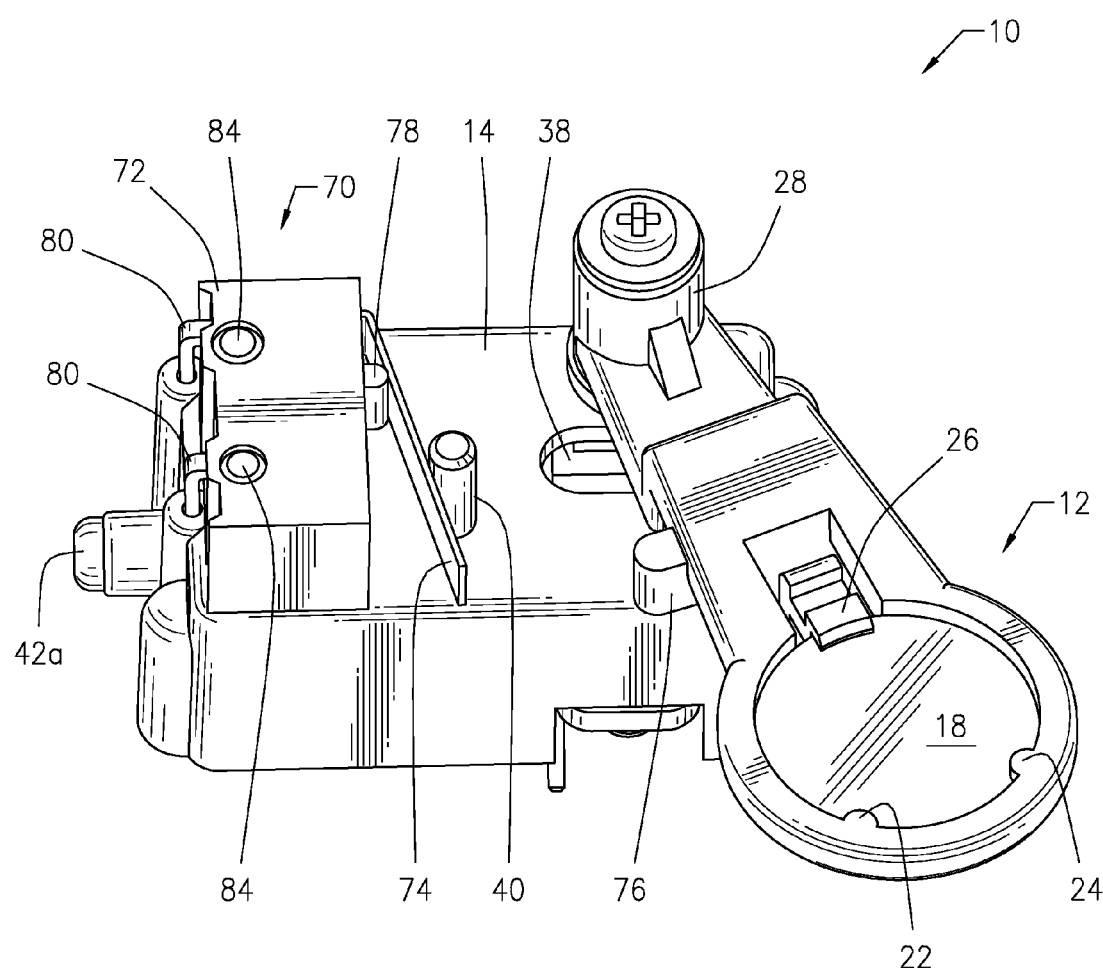
FIG. 8 is a perspective view of another example of a device for switching an optical lens filter for a camera in accordance with an illustrative embodiment of the device for switching an optical lens filter for a camera disclosed herein.
Figure 9:
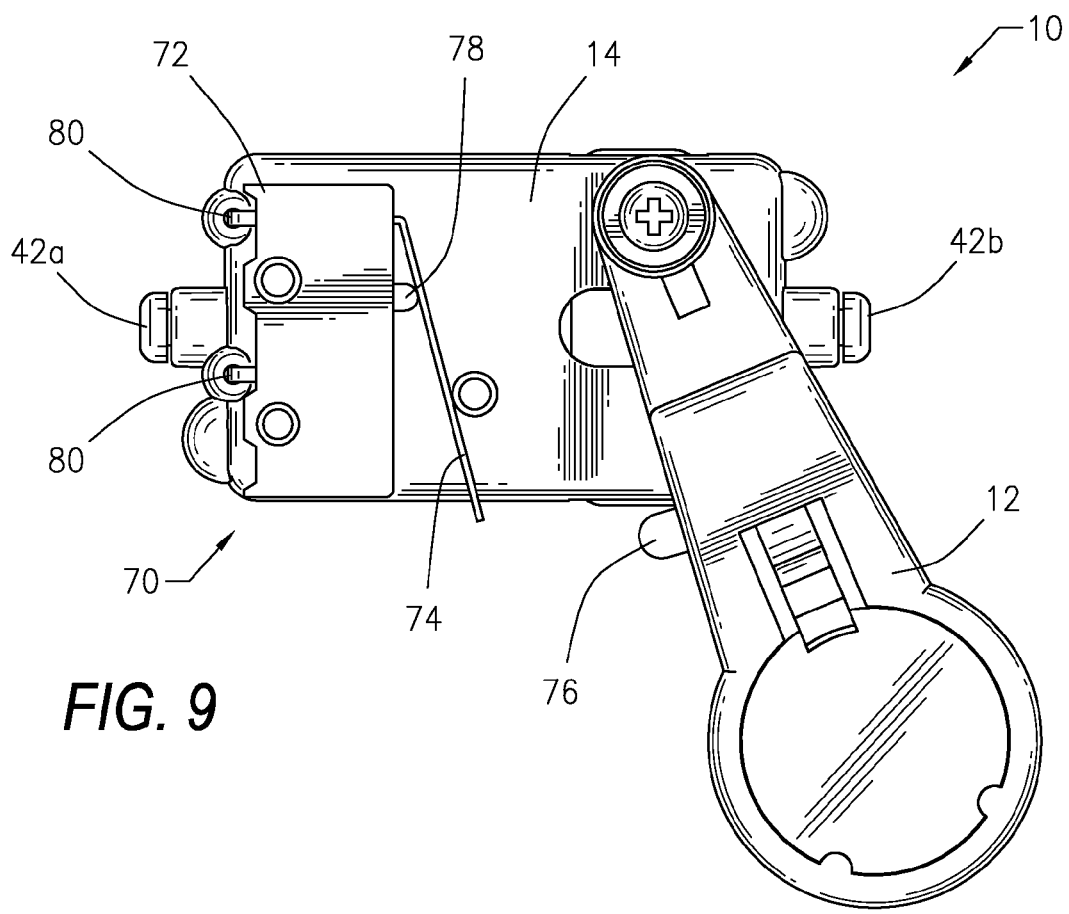
FIG. 9 is a top view of the device for switching an optical lens filter for a camera of FIG. 8 with the lens filter in a first position.

The cantilevered filter arm 12 may also include a generally cylindrical female coupling 28 that is pivotally engaged about an elongated cylindrical male coupling 30 protruding from the housing 14, such that the male coupling 30 acts as the point of rotation for the cantilevered filter arm 12 when moving between the first position illustrated in FIGS. 4 and 5 and the second position illustrated in FIGS. 6 and 7. For example, the female coupling 28 may have an inner diameter greater than an outer diameter of the male coupling 30, thereby enabling the female coupling 28 to rotating about the male coupling 30. The cantilevered filter arm 12 may be secured to the housing 14 using a standard screw 32 and a washer 34 as illustrated in FIG. 2. Additionally, the cantilevered filter arm 12 includes an elongated, protruding shaft 36 intermediate of the pocket 20 and the female coupling 28. As fully discussed below, the shaft 36 of the cantilevered filter arm 12 engages the electromechanical solenoid 16 secured within the housing 14.

The housing 14 with the electromechanical solenoid 16 secured therein includes a channel 38 through which the shaft 36 of the cantilevered filter arm 12 is disposed. The housing 14 may also include an elongated stop pin 40, which as illustrated, is substantially parallel to the male coupling 30. The stop pin 40 further limits movement of the cantilevered filter arm 12 when moving between the first position illustrated in FIGS. 4 and 5 and the second position illustrated in FIGS. 6 and 7. Each of the opposing ends of the housing 14 in substantial parallel alignment with the channel 38 includes a magnetic material, such as a ferromagnetic metal (e.g., iron) or a ferromagnetic compound (e.g., a ferrite). By way of exemplification, metallic screws 42a and 42b may be respectively threadably engaged with an opposing end of the housing 14.

The electromechanical solenoid 16 secured within the housing 14 includes an electromagnetically inductive coil 44 (e.g., a conductive copper wire) wound around a bobbin 46. The bobbin 46 includes an axial channel 48 in substantially parallel alignment with the channel 38 of the housing 14, and a magnet core or armature 50 is slidably disposed within the axial channel 48 of the bobbin 46. The armature 50 includes a bore 58, which is engaged with the shaft 36 of the cantilevered filter arm 12. A pair of substantially parallel coil pins 52 is disposed within a pair of coil pin apertures 56 in the bobbin 46 to complete the electromechanical solenoid 16 of the device for switching the optical filter lens for a camera 10. The bobbin 46 is secured to the housing 14, such as by way of screws 54 engaged with a mounting bracket 60 having apertures 62 in opposed shoulders 64. The mounting bracket 60 of the bobbin 46 may also includes a pair of opposing, substantially C-shaped members 66 to form channel 68, which effectively extends the axial channel 48 in the bobbin 46.

When an electric current is provided to the electromechanical solenoid 16, a magnetic field is produced by the coil 44 causing the armature 50 to move along the length of the axial channel 48 of the bobbin 46. As shown in FIGS. 4 and 5, when an electric current is applied to the electromechanical solenoid 16, the armature 50 moves toward the screw 42b into the first position illustrated therein. When the electric current is reversed thereby reversing the polarity of the magnetic field generated by the electromechanical solenoid 16, the armature 50, having the shaft 36 of the cantilevered filter arm 12 engaged therewith, moves within the axial channel 48 of the bobbin 46 toward the screw 42a causing the cantilevered filter arm 12 to move from the first position illustrated in FIGS. 4 and 5 to the second position illustrated in FIGS. 6 and 7.

Referring now to FIGS. 8 through 12, the device for switching an optical lens filter for a camera 10 may also having an electrical switch 70, such as a micro switch or a snap action switch, secured within a switch housing 72 to the housing 14, such as by way of switch mounting pins 84. The switch 70 detects the position of the cantilevered filter arm 12 in order to let a control circuit (not shown) know the position of the cantilevered filter arm 12 during operation. The switch 70 may include an arm 74 that is actuated by a protrusion 76 on the cantilevered filter arm 12 to activate the switch 70. When the cantilevered filter arm 12 moves from a first position (FIGS. 9 and 10) to a second position (FIGS. 11 and 12), the protrusion 76 on the cantilevered filter arm 12 contacts the arm 74 causing the arm 74 to depress an actuator button 78 to activate the switch 70. When the cantilevered filter arm 12 moves from the second position to the first position, the pressure on the arm 74 from the cantilevered filter arm 12 is removed, allowing the actuator button 78 to return to its original state.

Figure 10:
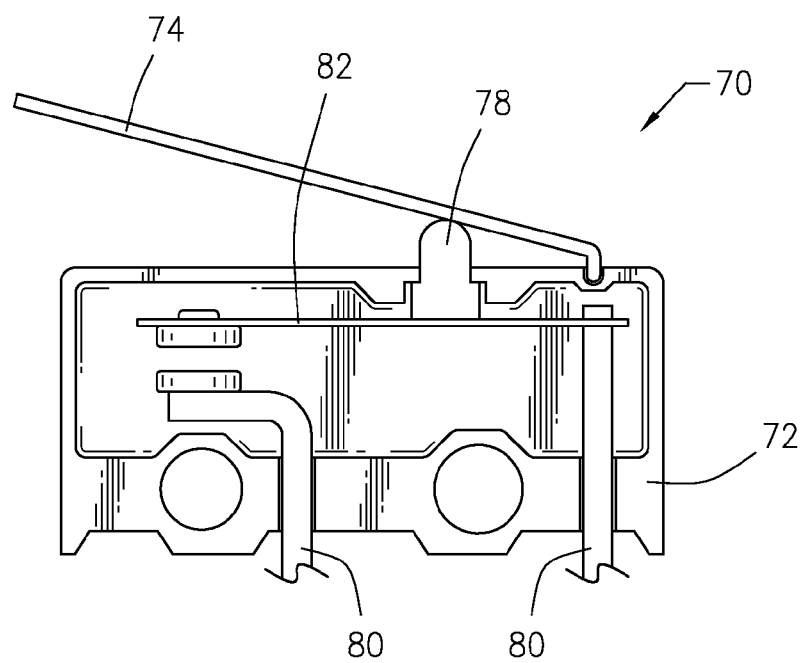
FIG. 10 is a bottom view of an example of an electrical switch in accordance with a illustrative embodiment of the device for switching an optical lens filter for a camera shown in FIG. 9.
Figure 11:
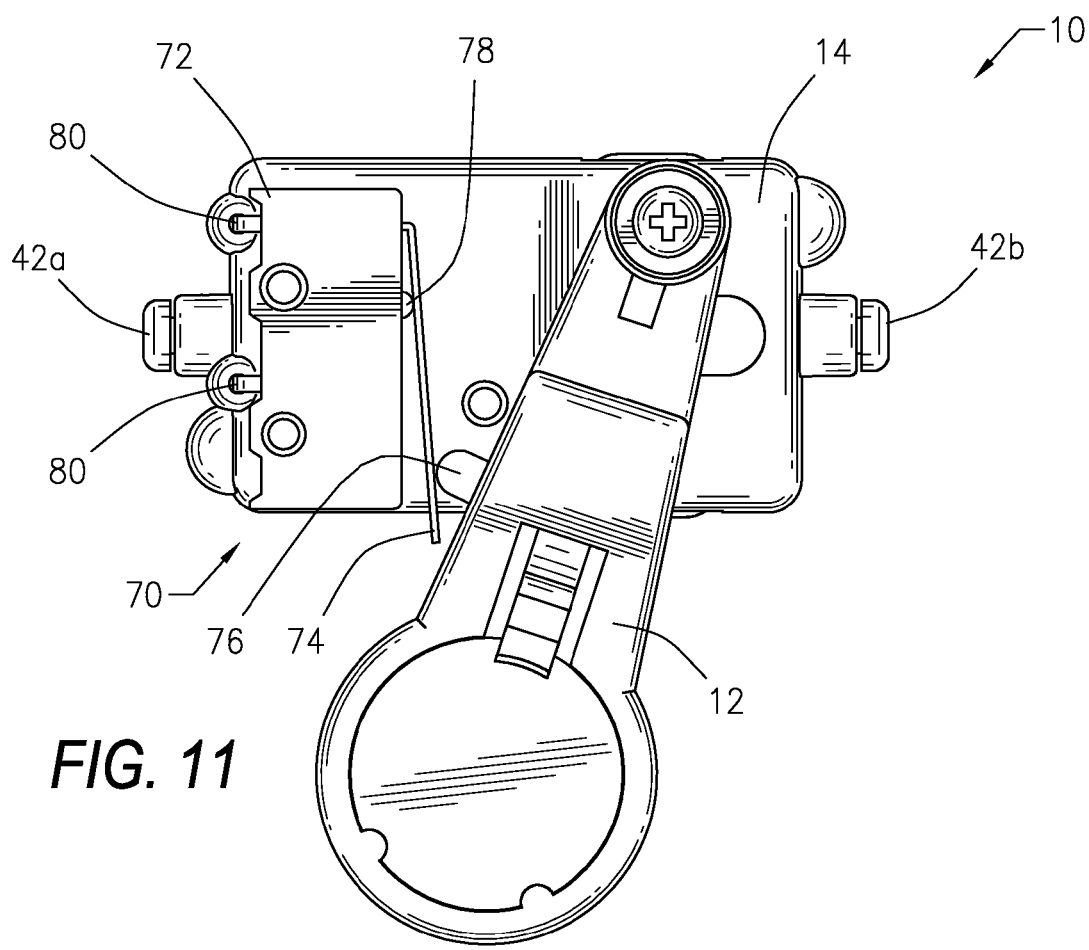
FIG. 11 is a top view of the device for switching an optical lens filter for a camera shown in FIG. 8 with the lens filter in a second position.
Figure 12:
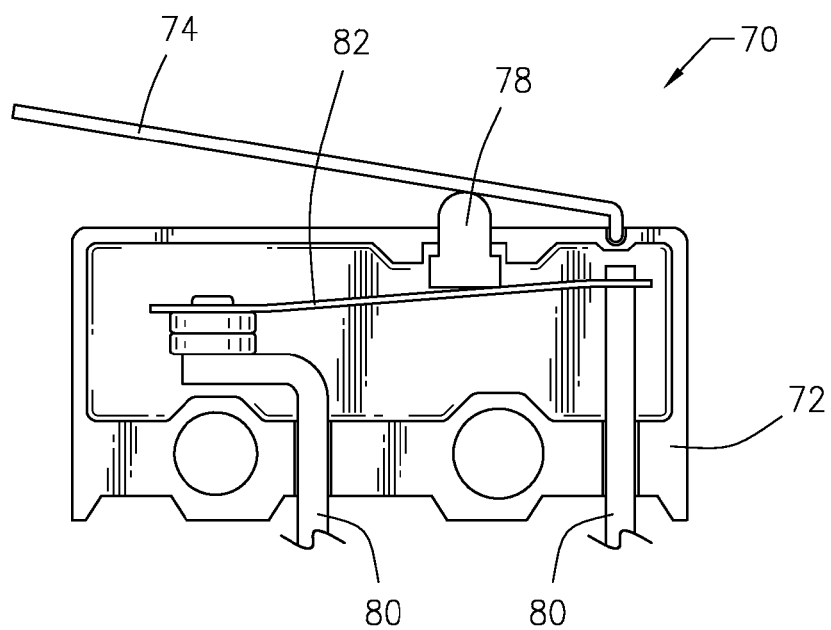
FIG. 12 is a bottom view of an example of an electrical switch in accordance with an illustrative embodiment of the device for switching an optical lens filter for a camera shown in FIG. 11.

As exemplified in FIGS. 9 through 12, within the switch housing 72 are electrical contacts 80 and a stiff metal strip 82. When the actuator button 78 is depressed by the arm 74, metal strip 82 is bent causing the electrical contacts 80 to come into electrical communication in order to activate the switch 70, as illustrated in FIG. 12. When the actuator button 78 is released, the metal strip 82 springs back to its original state, thereby removing the electrical communication between the electrical contacts 80, as illustrated in FIG. 10. It will be appreciated that other form of electrical switches may be utilized in keeping with the spirit and scope of the device for switching an optical lens filter for a camera 10.

Whereas, the devices and methods have been described in relation to the drawings and claims, it should be understood that other and further modifications, apart from those shown or suggested herein, may be made within the spirit and scope of this invention.

What is claimed is:

1. A device for switching an optical lens filter for a camera, said device comprising:

a cantilevered filter arm pivotally secured to a housing and having at least one optical lens filter capable of being selectively inserted into an optical path of a camera; and an electromechanical solenoid secured within said housing, said electromechanical solenoid having an armature engaged with an axial elongate shaft of said cantilevered filter arm, said armature slidably disposed within an axial channel of electromechanical solenoid, and said axial elongate shaft of said cantilevered filter arm being substantially perpendicular to said axial channel of said electromechanical solenoid;

wherein said electromechanical solenoid provides a linear mechanical force to pivot said cantilevered filter arm between a first position and a second position according to a polarity of a magnetic field generated by said electromechanical solenoid.

2. The device of claim 1 wherein said cantilevered filter arm is pivotally secured to said housing at a first end thereof and has said optical lens filter removably secured to a second end, and wherein said cantilevered filter arm includes said axial elongate shaft intermediate of the first end and the second end.

3. The device of claim 2 wherein said first end of said cantilevered arm includes a generally cylindrical female coupling pivotally engaged about an elongated cylindrical male coupling protruding from said housing, and wherein said male coupling acts as the point of rotation for said cantilevered filter arm when pivoting between said first position and said second position.

4. The device of claim 1 wherein said electromechanical solenoid further comprises an electromagnetically conductive coil wound around a bobbin, said bobbin having said axial channel in a substantially parallel alignment with a channel of said housing through which said elongate shaft of said cantilevered arm protrudes.

5. The device of claim 4 wherein said housing further comprises opposing, lateral ends having a magnetic material.

6. The device of claim 5 wherein said magnetic material is a ferromagnetic metal or a ferromagnetic compound.

7. The device of claim 1 further comprising an electrical switch for determining a position of said cantilevered filter arm.

8. The device of claim 7 wherein said cantilevered filter arm further comprises a switch protrusion.

9. The device of claim 7 wherein said electrical switch is within a switch housing that is secured to said housing.

10. The device of claim 7 wherein said electrical switch is a micro switch or a snap action switch.

11. The device of claim 10 wherein said electrical switch further comprises an arm, an actuator button, a stiff metal strip and electrical contacts.

12. A device for switching an optical lens filter for a camera, said device comprising:

a cantilevered filter arm having at least one optical lens filter capable of being selectively inserted into an optical path of a camera, said cantilevered filter arm pivotal about an elongate, protruding shaft; and a linear electromechanical solenoid, said linear electromechanical solenoid having an armature engaged with said elongate, protruding shaft of said cantilevered filter arm;

wherein said linear electromechanical solenoid provides a mechanical force along a first linear axis to pivot said cantilevered filter arm about a second rotational axis, wherein said second rotational axis is substantially perpendicular to said first linear axis, and wherein said cantilevered filter arm pivots between a first position and a second position according to a polarity of a magnetic field generated by said electromechanical solenoid.

13. The device of claim 12 wherein said cantilevered filter arm is pivotally secured at a first end and has said optical lens filter removably secured to a second end, and wherein said cantilevered filter arm includes said elongate, protruding shaft intermediate of the first end and the second end.

14. The device of claim 13 wherein said first end of said cantilevered arm includes a generally cylindrical female coupling pivotally engaged about an elongated cylindrical male coupling protruding from said housing, and wherein said male coupling acts as the point of rotation for said cantilevered filter arm when pivoting between said first position and said second position.

15. The device of claim 12 wherein said electromechanical solenoid further comprises an electromagnetically conductive coil wound around a bobbin, said bobbin having an axial channel with said armature slidably disposed therein, said elongate, protruding shaft of said cantilevered filter arm being substantially perpendicular to said axial channel in said bobbin.

16. The device of claim 15 further comprising a housing having opposing, lateral ends with a magnetic material.

17. The device of claim 12 further comprising an electrical switch for determining a position of said cantilevered filter arm.

18. The device of claim 17 wherein said cantilevered filter arm further comprises a switch protrusion.

19. The device of claim 17 wherein said electrical switch is a micro switch or a snap action switch.

20. The device of claim 19 wherein said electrical switch further comprises an arm, an actuator button, a stiff metal strip and electrical contacts.

* * * * *